United States Patent
Doshi

(10) Patent No.: US 9,807,182 B2
(45) Date of Patent: *Oct. 31, 2017

(54) DETERMINATION OF USER REPUTATION REGARDING DATA OBJECT EXPOSURE IN CLOUD COMPUTING ENVIRONMENTS

(71) Applicant: PALO ALTO NETWORKS, INC., Santa Clara, CA (US)

(72) Inventor: Nishant Doshi, Sunnyvale, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/461,736

(22) Filed: Aug. 18, 2014

(65) Prior Publication Data

US 2015/0312262 A1    Oct. 29, 2015

Related U.S. Application Data

(60) Provisional application No. 61/984,923, filed on Apr. 28, 2014, provisional application No. 62/022,818, filed on Jul. 10, 2014.

(51) Int. Cl.
*H04L 29/06* (2006.01)
*H04L 29/08* (2006.01)

(52) U.S. Cl.
CPC .......... *H04L 67/22* (2013.01); *H04L 67/1002* (2013.01)

(58) Field of Classification Search
CPC ... H04L 63/105; H04L 63/1433; H04L 43/08; H04L 43/04; H04L 67/10; H04L 67/22; H04L 63/1408; H04L 63/1441; H04L 67/20; H04L 67/1002; G06F 21/552; G06F 21/566; G06F 21/577
USPC .......................................................... 726/25
See application file for complete search history.

(56) References Cited

U.S. PATENT DOCUMENTS

| | | | | |
|---|---|---|---|---|
| 8,782,217 B1* | 7/2014 | Arone | .................... | H04W 12/08 709/224 |
| 2008/0177594 A1* | 7/2008 | Lamoureux | .......... | G06Q 20/382 705/7.29 |
| 2013/0268994 A1* | 10/2013 | Cooper | .................... | H04L 63/10 726/1 |
| 2014/0075500 A1* | 3/2014 | B'Far et al. | ....................... | 726/1 |
| 2014/0282977 A1* | 9/2014 | Madhu | ................. | G06Q 50/265 726/7 |
| 2015/0304399 A1* | 10/2015 | Kramer | ................. | G06F 9/4843 713/162 |

\* cited by examiner

*Primary Examiner* — Edward Zee
*Assistant Examiner* — Chi Nguy

(57) ABSTRACT

Embodiments disclosed herein provide systems, methods, and computer readable media for determining user reputation regarding data object exposure in a cloud computing environment. In a particular embodiment, a method provides receiving, from the cloud computing environment, information regarding behavior of a user in the cloud computing environment. The method further provides analyzing the information to determine a plurality of exposure characteristics for the user. The method provides determining a reputation of the user for exposing data objects in the cloud computing environment based on the plurality of exposure characteristics.

20 Claims, 6 Drawing Sheets

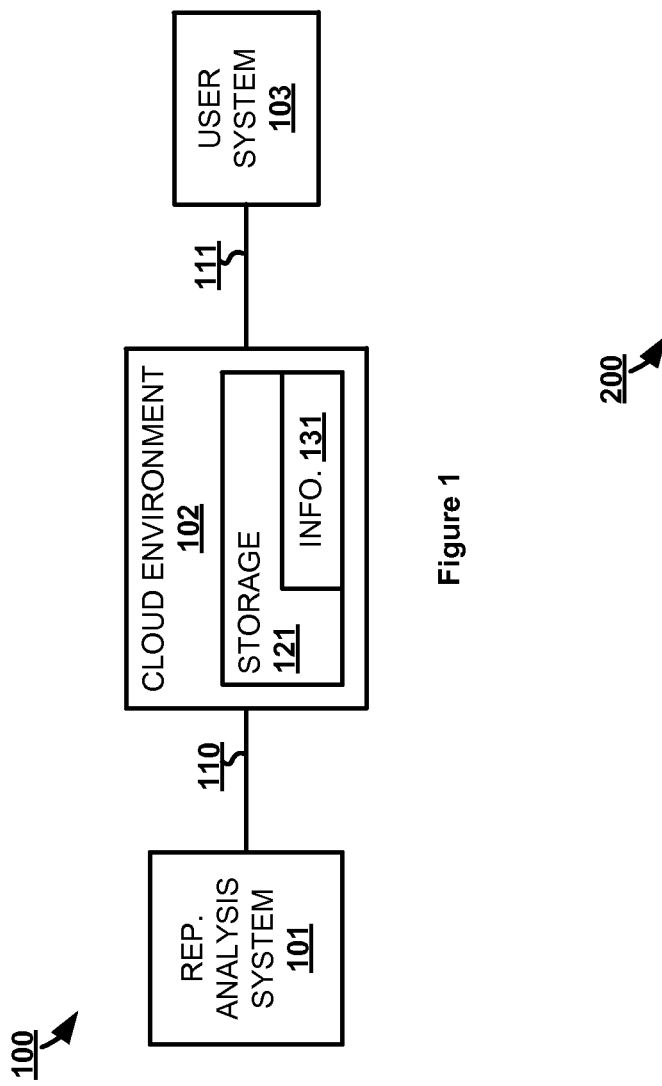
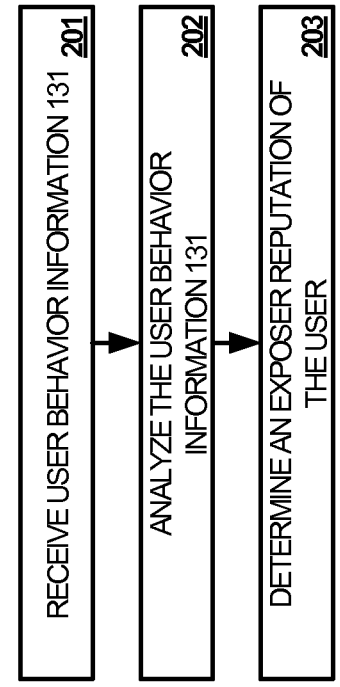

371

| ACCT. INFO. 801 | | SETTINGS 601 | | METADATA 602 | |
|---|---|---|---|---|---|
| DAILY LOGINS | 5 | USER | John Doe | TYPE | File |
| USER SYS. | 3 | AMT. SHARED | 2 | LAST ACCESS | 3 Days |
| OBJECTS | 26 | PUBLIC FLDR. | No | PARENT FLDR. | HR |

372

| ACCT. INFO. 802 | | SETTINGS 701 | | METADATA 702 | |
|---|---|---|---|---|---|
| DAILY LOGINS | 32 | USER | John Doe | TYPE | File |
| USER SYS. | 8 | AMT. SHARED | 0 | LAST ACCESS | 20 min. |
| OBJECTS | 87 | PUBLIC FLDR. | Yes | PARENT FLDR. | Misc. |

Figure 8

DETERMINATION OF USER REPUTATION REGARDING DATA OBJECT EXPOSURE IN CLOUD COMPUTING ENVIRONMENTS

RELATED APPLICATIONS

This application is related to and claims priority to U.S. Provisional Patent Application No. 62/022,818, entitled "DETERMINATION OF USER REPUTATION REGARDING DATA OBJECT EXPOSURE IN CLOUD COMPUTING ENVIRONMENTS," filed on Jul. 10, 2014, and U.S. Provisional Patent Application No. 61/984,923, entitled "DETERMINATION OF DATA OBJECT EXPOSURE IN CLOUD COMPUTING ENVIRONMENTS," filed on Apr. 28, 2014, which are both hereby incorporated by reference in their entirety.

TECHNICAL BACKGROUND

Cloud computing is becoming more prevalent. Some of the more basic cloud computing services store files so that the files can be accessed from any computer system that is able to log into the cloud computing service storing the files. More complex cloud computing services provide a remote platform for providing their services to customers. These more complex cloud computing services are sometimes referred to as Software as a Service (SaaS), Platform as a service (PaaS), and Infrastructure as a Service (IaaS).

While various cloud computing services provide services to individuals, some cloud computing services also provide services to entities. For example, a business entity may subscribe to a particular cloud computing service for use by employees of the business entity. Each of the employees may be able to independently modify access settings for data objects maintained in the cloud computing service. Consequently, the entity may not be aware when settings for the data objects provide more exposure for the object than would be desired by the entity. For example, an entity may prefer that settings for an object prevent access by people or applications outside of the entity because of sensitive information within the object but has no practicable means of enforcing such a preference.

Overview

Embodiments disclosed herein provide systems, methods, and computer readable media for determining user reputation regarding data object exposure in a cloud computing environment. In a particular embodiment, a method provides receiving, from the cloud computing environment, information regarding behavior of a user in the cloud computing environment. The method further provides analyzing the information to determine a plurality of exposure characteristics for the user. The method provides determining a reputation of the user for exposing data objects in the cloud computing environment based on the plurality of exposure characteristics.

In some embodiments, the method further provides that determining a reputation of the user for exposing data objects in the cloud computing environment, comprises applying a plurality of rules to the plurality of exposure characteristics and determining the reputation based on how well the plurality of exposure characteristics comply with the plurality of rules.

In some embodiments, the information includes accessibility settings for a plurality of data objects associated with the user in the cloud computing environment.

In some embodiments, the information includes classifications for each of a plurality of data objects associated with the user.

In some embodiments, the method provides that receiving the information comprises using Application Programming Interface (API) calls for the cloud computing environment to request the information.

In some embodiments, the method provides that using API calls for the cloud computing environment to request the information comprises impersonating a user associated with the data object, wherein the API calls comprise API calls only available to the user.

In some embodiments, the method further provides generating a notification indicating the reputation and remedial actions that will compensate for the reputation.

In some embodiments, the cloud computing environment includes at least two cloud computing services associated with the user and the method provides that receiving the information comprises receiving first information regarding behavior of the user from a first cloud computing service of the cloud computing services and receiving second information regarding behavior of the user from a second cloud computing service of the cloud computing services.

In some embodiments, the method provides that determining the reputation comprises lowering a current reputation if the plurality of exposure characteristics indicates a higher risk of exposure than a risk of exposure indicated by the current reputation.

In a further embodiment, a computer readable storage medium having instructions stored thereon is provided for operating a reputation analysis system to determine user reputation regarding data object exposure in a cloud computing environment. The instructions, when executed by the reputation analysis system, direct the reputation analysis system to receive, from the cloud computing environment, information regarding behavior of a user in the cloud computing environment. The instructions further direct the reputation analysis system to analyze the information to determine a plurality of exposure characteristics for the user and determine a reputation of the user for exposing data objects in the cloud computing environment based on the plurality of exposure characteristics.

In yet another embodiment, a reputation analysis system is provided for determining user reputation regarding data object exposure in a cloud computing environment. The reputation analysis system includes a network communication interface configured to receive, from the cloud computing environment, information regarding behavior of a user in the cloud computing environment. The reputation analysis system further includes a processing system configured to analyze the information to determine a plurality of exposure characteristics for the user and determining a reputation of the user for exposing data objects in the cloud computing environment based on the plurality of exposure characteristics.

BRIEF DESCRIPTION OF THE DRAWINGS

FIG. 1 illustrates a cloud computing system for determining user reputation regarding data object exposure in a cloud computing environment.

FIG. 2 illustrates an operation of the cloud computing system to determine user reputation regarding data object exposure in a cloud computing environment.

FIG. 8 illustrates data object characteristics for determining user reputation regarding data object exposure in a cloud computing environment.

DETAILED DESCRIPTION

Figure 3:
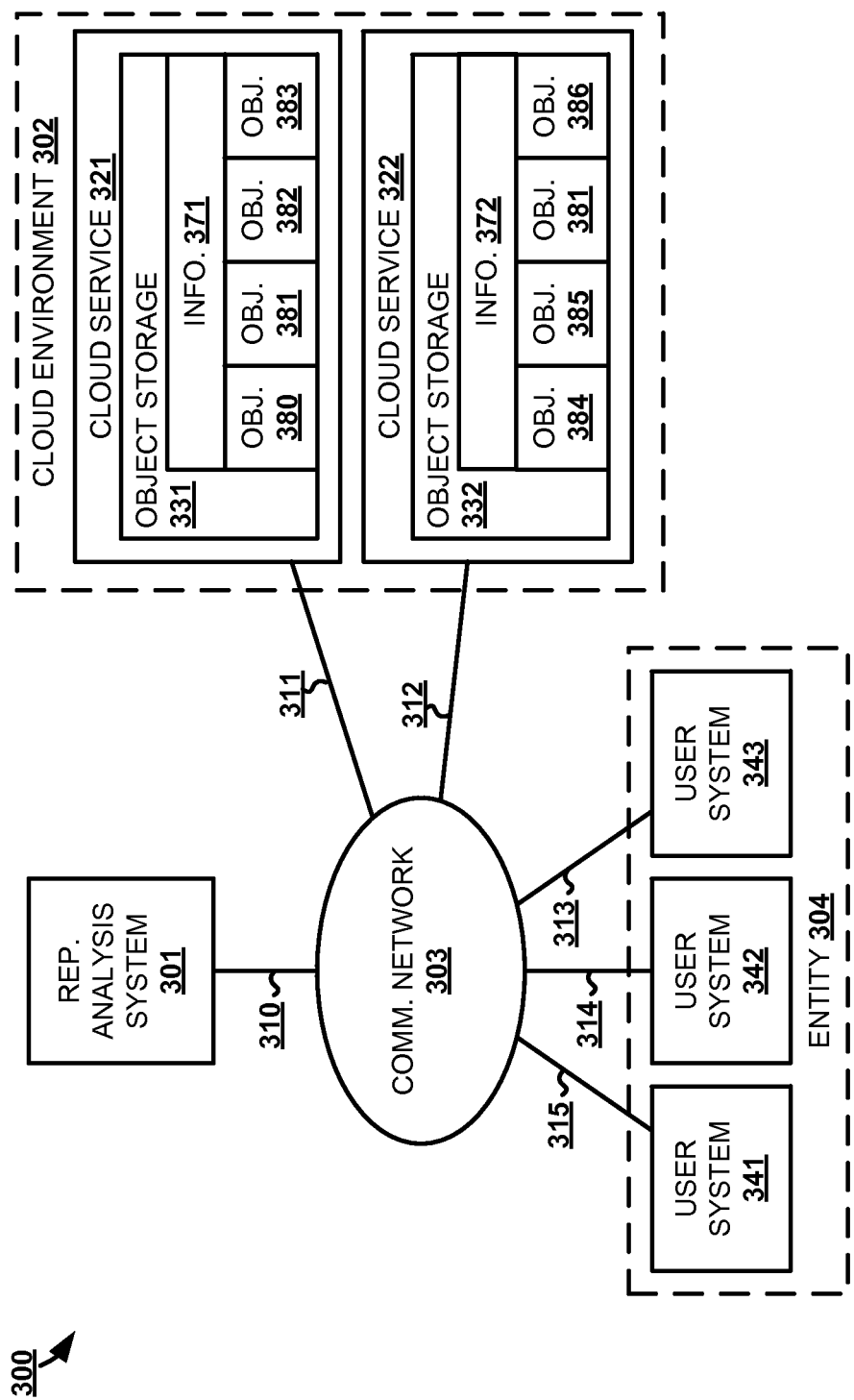
FIG. 3 illustrates a cloud computing system for determining user reputation regarding data object exposure in a cloud computing environment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates cloud computing system 100. Cloud computing system 100 includes reputation analysis system 101, cloud computing environment 102, and user system 103. Cloud computing environment 102 includes storage system 121, which stores information 131. Reputation analysis system 101 and cloud computing environment 102 communicate over communication link 110. Cloud computing environment 102 and user system 103 communicate over communication link 111.

In operation, cloud computing environment 102 provides one or more cloud computing services to user system 103. While not shown, cloud computing environment 102 may also provide services to any number of user systems beyond user system 103. The services provided by cloud computing environment 102 may include file storage and sharing, document collaboration, client and customer management services, cloud based operating system execution, or any other possible service that may be provided to a user via a remote computing platform. Example cloud services include BOX, DROPBOX, SALESFORCE, YAMMER, FACEBOOK, EVERNOTE, or any other SaaS, PaaS, or IaaS.

Information 131 is maintained in storage system 121 and regards behavior of a user of user system 103 in cloud computing environment 102. Specifically, cloud environment 121 maintains data objects to provide services to user system 103 and its user. The data objects may be stored in storage system 121 along with information 131 or may be stored in a different storage system within cloud environment 102. Data objects may be structured or unstructured data, such as a file uploaded to cloud computing environment 102 from user system 103, a customer relationship management object, or other data, possibly organized into tables, lists, and the like, corresponding to interactions, notes, and status updates, depending on the type of service provided.

Accordingly, behavior information 131 corresponds to any way in which the user of user system 103 is able to change access settings, modify contents, or otherwise interact with or control one or more data objects within cloud environment 102. Furthermore, behavior information 131 includes information about a user's interaction with the cloud environment account through which the data objects are maintained, such as user login information and account settings. Information 131 may also include historical information corresponding to the user's past behavior. Alternatively, information 131 may only include the current state and reputation analysis system may compile past states of information 131.

Information 131 is used by reputation analysis system 101 to determine a reputation for the user of user terminal 103 with respect to exposure of data objects in cloud environment 102. When used herein, exposure refers to whether a data object be retrieved, viewed, changed, or otherwise accessed—including combinations thereof—by users, systems, or applications beyond what may be desired by the user of user system 103 or other interested party, such as that user's employer. For example, a cloud storage service may provide public folders in which anyone who finds the folder can access files stored therein. Thus, the exposure for a data object that a user has stored in a public folder may be considered greater than the exposure for that same data object stored in a private folder and shared only with a limited number of people.

To assist in preventing a user from overly exposing data objects, the user reputation determined by reputation analysis system 101 indicates the user's reputation for overly exposing data objects. For example, a user that tends to overly expose data objects will be given a reputation by reputation analysis system 101 that indicates that tendency. Likewise, a user that does not expose data objects will be given a reputation by reputation analysis system 101 that indicates that tendency. The reputation of the user may then be used to mitigate the over exposure of data objects in cloud environment 102.

FIG. 2 illustrates the operation 200 of cloud computing system 100 to determine user reputation regarding data object exposure. The method of operation includes reputation analysis system 101 receiving, from cloud computing environment 102, information 131 regarding behavior of a user in cloud computing environment 102 (step 201). Information 131 is analyzed by reputation analysis system 101 to determine a plurality of exposure characteristics for the user (step 202). Based on the exposure characteristics, reputation analysis system 101 determines a reputation of the user for exposing data objects in cloud computing environment 102 (step 203).

The information may be received over a communication network or may be received in any other manner by which a computer system could receive data, including reading the information off of optical disks or other type of removable media. Additionally, the functionality of reputation analysis system 101 may be integrated into a service of could computing environment 102. In those situations, the information may be received from other elements of the service.

The exposure characteristics may include any include items of the information, or derived from the information, that explicitly or implicitly indicate the exposure of data objects associated with the user. As data object is considered to be associated with the user if the user in some way is able to control access to the object or otherwise manipulate the object. For example, the user may have directed the creation of the data object in cloud environment 102 or was otherwise given the ability to control the object. Furthermore, the exposure characteristics considered by reputation analysis system 101 may only be exposure characteristics that are under the control of the user. In this manner, characteristics that are not the result of the user's behavior are not factored into the user's reputation.

Examples of exposure characteristics include a number of container objects created by the user, a number of objects created by the user in cloud environment 102, a ratio of the number of container objects (e.g. folders) created by the user to the number of non-container objects created by the user, the average number of nested containers, an aggregate number of actions (e.g. downloads, preview, sync, edits, creates etc.) performed across all data objects, average number of unique actions performed for each data object, a number of days elapsed since any particular action was performed on any data object, an aggregate number of days since last login to the user's account, an aggregate number of logins, an aggregate number of failed logins, an aggregate number of devices that the user has logged in from, a time of the day the user has accessed cloud environment 102, a number of countries where the user has accessed cloud environment 102, countries from where the user has access cloud environment 102, an average number of collaborators that the user has invited per data object, an aggregate number of collaborators that the user has invited across all data objects, an average number of external collaborators (users who don't belong to an entity with which the user's account is associated) that the user has invited to collaborate per data object, an aggregate number of collaborators that the user has invited per data object, an average number of sharing actions created per data object, an aggregate number of sharing actions across all data objects, an average number of times a data object created by the user has been accessed via actions, an average number of times a data object created by the user has been accessed by an external user, a business role of the user, a total number of data objects to which the user has access, total number of data objects not owned by the user to which the user has access, characterizations of data objects to which the user has access (e.g. legal, financial, high or low sensitivity, etc.), a number of direct reports the user has, groups that the user is a member of within an entity associated with the user's cloud environment account, a number of false positive reports in the system for this user, whether the user is an employee/contractor/customer of the entity, a number of violations in the past, or any other characteristic that could explicitly or implicitly indicate data object exposure.

The user reputation is calculated from the exposure characteristics and may be expressed as a value on a number scale (e.g. 1 to 10, with 10 indicating the user has a reputation of exposing objects, or vice versa), a percentage, a rank in relation to other objects, a multi-level scale (e.g. poor, satisfactory, good, best), or any other way in which a reputation may be expressed. Reputation analysis system 101 may weigh different exposure characteristics differently when determining the indication. For example, the number of untrusted users allowed to access a data object may affect the user's reputation more so than the number of user systems through which the user accesses his or her account. In some examples, these weights may be determined based on rules that indicate importance of certain characteristics over others. Additionally, the reputation may be separated into multiple distinct reputations that each indicate reputations relative to specific criteria. For example, one reputation may correspond to overall exposure in cloud environment 102 while another reputation may correspond to exposure relative to a regulatory scheme, governmental or otherwise. Similarly, the multiple reputations may relate to different types of exposure. For example, one reputation may relate to public exposure of data objects while another reputation may relate to exposure of data objects to other departments within the same entity.

Additionally, one or more of the reputations generated for a user may factor in or indicate policy compliance by the user. The policy may apply to the number of collaborators, privacy setting requirements for data objects, the number of instances of the same data object allowed, limits on domains from which objects can be accessed, limits on countries from where objects can be accessed, guidelines on sharing with users having high risk behavior in cloud environment 102 or are no longer with the company, the volume of files uploaded at one time, non-business hour activity, or any other action that the user may take with respect cloud environment 102. Thus, generally, the policies may be compliance policies, acceptable use policies, HR policies, financial policies, intellectual property policies, anomalous download policies, or the like. As with other user reputation factors, the compliance with these policies is determined from the exposure characteristics. Furthermore, in addition to generating a reputation regarding policy, reputation analysis system 101 may also indicate which policies have be violated so that remedial actions can be taken.

Advantageously, the embodiments described above allow reputation analysis system 101 to indicate the reputations of a user for exposing objects stored in cloud computing environment 102. This reputation may be supplied to the user or another interested party, such as an entity or enterprise associated with the user, which includes third parties. The interested party will therefore be aware of the user's reputation that it would not have known about otherwise. The interested party may then, if necessary, take steps to improve the user's reputation.

Referring back to FIG. 1, reputation analysis system 101 comprises a computer system and communication interface. Reputation analysis system 101 may also include other components such as a router, server, data storage system, and power supply. Reputation analysis system 101 may reside in a single device or may be distributed across multiple devices. Reputation analysis system 101 is shown externally to cloud computing environment 102, but system 101 could be integrated within the components of cloud computing environment 102. Reputation analysis system 101 could be an application server, a personal workstation, a service node, or some other network capable computing system—including combinations thereof.

Cloud computing environment 102 comprises a computer system, communication interface and storage system 121. Cloud computing environment 102 may also include other components such as a router, server, and power supply. Cloud computing environment 102 may reside in a single device or may be distributed across multiple devices. Cloud computing environment 102 may include multiple cloud services each provided by multiple systems and not necessarily co-located or operated by a common entity (e.g. may include a cloud storage service provided by one company and a customer management service provided by another company). Cloud computing environment 102 could be an application server, service node, or some other computing system—including combinations thereof.

User system 103 comprises a computer system and a communication interface. User system 103 may also include a user interface, memory device, software, processing circuitry, or some other communication components. User system 103 may be a telephone, tablet, computer, e-book, mobile Internet appliance, wireless network interface card, media player, game console, or some other end user computing apparatus—including combinations thereof.

Communication links 110-111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 110-111 could be direct links or may include intermediate networks, systems, or devices.

FIG. 3 illustrates cloud computing system 300. Cloud computing system 300 includes reputation analysis system 301, cloud computing service 321, cloud computing service 322, user systems 341-343, and communication network 303. Cloud computing service 321 includes object storage 331 that stores user behavior information 371 data objects 380, 381, 382, and 383. Similarly, cloud computing service 322 includes object storage 332 that stores user behavior information 372 and data objects 384, 385, 381, and 386.

Communication network 303 comprises network elements that provide communications services to reputation analysis system 301, cloud services 321-322, and user systems 341-343. Communication network 303 may comprise switches, wireless access nodes, Internet routers, network gateways, application servers, computer systems, communication links, or some other type of communication equipment—including combinations thereof. Communication network 303 may include wide area networks, local area networks, the Internet, or other types of networks—including combinations thereof.

In operation, users associated with entity 304 operate user systems 341-343. User systems 341-343 may be provided to the users by entity 304 or may otherwise be able to access services to which entity 304 subscribes. In this example, entity 304 is a business enterprise and the users are employees of that business. Entity 304 subscribes to services provided by cloud services 321 and 322 for the employees of entity 304. Cloud services 321 and 322 may be otherwise unrelated cloud services operated by independent entities but, for the purposes of this example, are considered part of cloud computing environment 302 for entity 304. Each employee receives individual login information to individual accounts on each of services 321 and 322 and can use each of the services to the extent that entity 304 is subscribed (e.g. within the limits of entity 304's service agreement).

To help ensure no sensitive information becomes overly exposed during the employees' use of cloud services 321 and 322, entity 304 uses reputation analysis system 301 to inform entity 304 about each employee's reputation for exposing data objects. Reputation analysis system 301 may be controlled directly by entity 304 (i.e. may be owned or operated by entity 304) or entity 304 may subscribe to services provided by reputation analysis system 301 through a third party operator of reputation analysis system 301.

Figure 4:
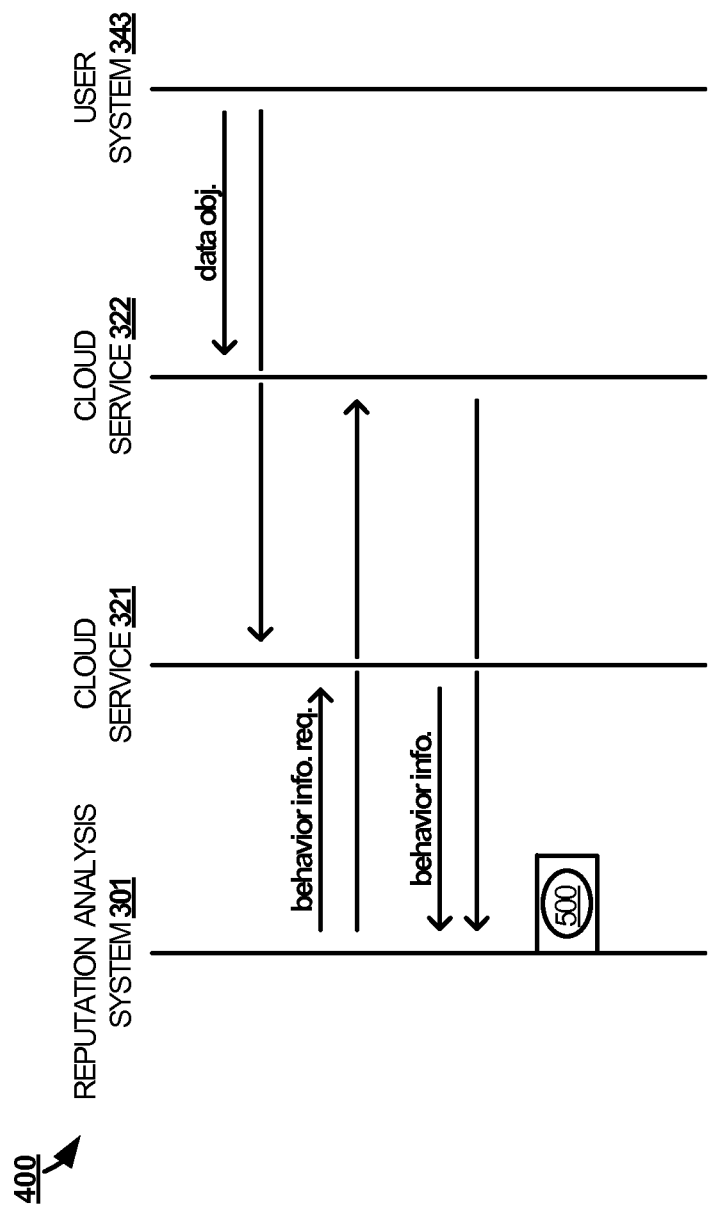
FIG. 4 illustrates an operation of the cloud computing system to determine user reputation regarding data object exposure in a cloud computing environment.

FIG. 4 illustrates operation 400 of cloud computing system 300 to determine user reputation regarding data object exposure. Specifically, operation 400 illustrates the generation of a user reputation for the employee operating user system 343. A similar method is used to generate reputations of other employees. Additionally, it should be understood that a single employee might use more than one user system to access data objects in cloud service. For example, an employee may access cloud services 321 and 322 using a phone, tablet, personal computer, and a web interface.

Operation 400 begins with the employee using user system 343 creating objects 380-386 in the employee's account in cloud services 321-322 as pictured in FIG. 3. To create the objects, the objects may be uploaded to cloud services 321-322, may be generated at cloud services 321-322 in response to directions from user system 343, or may become stored in cloud service 321-322 by some other means. One particular data object 381 is located in both cloud service 321 and cloud service 322.

Reputation analysis system 301 then uses Application Programming Interface (API) calls for each of cloud services 321-322 to request user behavior information 371 regarding the employee's behavior in each of cloud services. For example, the user behavior information 371 and 372 may include accessibility settings, metadata, or any other type of information about data objects 380-386. User behavior information 371 and 372 may further include information that does not directly relate to a specific data object, such as activity logs, which include account login history and the like. While behavior information 371 is shown as stored in object storage 331, behavior information 371 may be stored in a separate storage system within cloud service 321. Similarly, while behavior information 372 is shown as stored in object storage 332, behavior information 372 may be stored in a separate storage system within cloud service 322.

The API used for each of cloud services 321-322 may include the same API calls typically used by user systems to interact with the cloud services. For example, there may be an API call for one or more of cloud services 321-322 that allows a user to request with whom a particular data object is shared. In some examples, even though entity 304 is subscribing to cloud services 321-322 on behalf of its employees, one or more of cloud services 321-322 may not allow entity 304 to use certain API calls to access user specific information. In those cases, reputation analysis system 301 impersonates individual users so that reputation analysis system 301 can request the information. The impersonation may be performed with the consent of the user since the user is an employee of entity 304 and is using a service subscribed to by entity 304.

In some embodiments, one or more of cloud services 321-322 may provide APIs that allow code to execute within the cloud service on behalf of reputation analysis system 301. In those examples, the code may transfer information 371 and 372 to reputation analysis system 301 periodically or upon certain triggers. For example, upon settings for a particular object being changed, the code may instruct the cloud service to transfer a notification of those changes to reputation analysis system 301.

Figure 5:
FIG. 5 illustrates an operation of the cloud computing system to determine user reputation regarding data object exposure in a cloud computing environment.

Once the requested behavior information 371 and 372 is received by reputation analysis system 301, reputation analysis system 301 analyses the information in accordance with operation 500 in FIG. 5. In particular, reputation analysis system 301 identifies exposure characteristics from the received behavior information 371 and 372 (step 501). Rules are then applied to the identified exposure characteristics (step 502). The rules may be business rules identified by entity 304 based on exposure characteristics that entity 304 believes are desirable or relate to a policy.

Based on how the exposure characteristics satisfy the rules, reputation analysis system 301 determines a reputation for the employee operating user system 343 (step 503). For example, if the employee's behavior as indicated by the exposure characteristics fall within the parameters of the rules, then the employee's reputation for exposing data objects is generated to indicate a good reputation. Alternatively, if the rule application to the exposure characteristics indicates that the employee has allowed more than a defined number of sensitive data objects to be accessed by untrusted individuals, then the employee's reputation is generated to indicate a poor reputation.

In some embodiments, reputation analysis system 301 continues to receive updates to information 371 and 371, which allows reputation analysis system 301 to adjust the reputation of the employee based on the newly received information. Thus, the employee's reputation may be bettered or worsened depending upon how exposure characteristics identified from the new information comply with the rules.

Upon determining the reputation of the employee, reputation analysis system 301 may notify entity 304 of the reputation. For example, a notification may be sent to an administrator within entity 304 via email, a dedicated application for interacting with reputation analysis system 301, a web interface to reputation analysis system 301, or by some other notification means. A notification may further be sent to the employee for which the reputation is generated (i.e. the employee operating user system 343 in this embodiment).

In some embodiments, the notification may be presented as part of a software extension over the application sued to access one or more of cloud services 321 and 322. For example, if cloud services are accessed through a browser interface, a browser extension may overlay information on the cloud service interface or modify the display of the cloud service interface to indicate the reputations.

In some examples, the notification only indicates the reputation of the employee if the reputation meets a threshold reputation criteria (e.g. if the reputation is worse than a desired reputation threshold). If the employee's reputation does not meet the threshold, then the notification is either not generated for the single employee or that single employee's reputation is not included in a notification having reputations of multiple employees. The notification may also indicate specific reasons as to why an employee received his or her reputation was determined (e.g. which exposure characteristics did not satisfy the rules). Such an indication may allow an employee, administrator, or other interested party, to change the offending characteristics to improve the reputation. Similarly, in some examples, the notification may explicitly set forth recommended actions that can be taken to improve the employee's reputation. These actions may include both automatic (which may also be performed by system 301 without notification) and manual remedial actions that should improve the employee's reputation. For example, the actions may include changing access settings for exposed objects, such as disabling a public link to the objects, expiring the link, remove access from certain users, modifying or encrypting the data objects, deleting the data objects, changing login passwords, changing user privileges (e.g. not allowing the user to share data objects), or notifying the data owner or manager. Reputation analysis system 301 may also log the notification data in an incident module for future access.

Using reputation analysis system 301 in the manner described above, entity 304 can better ensure that its employees are not using cloud computing services 321-322 in a manner that would expose information that entity 304 would not want disclosed.

Figure 6:
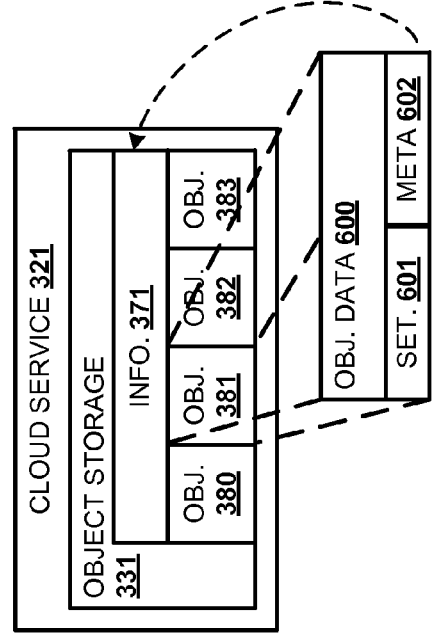
FIG. 6 illustrates a cloud computing service for determining user reputation regarding data object exposure in a cloud computing environment.

FIG. 6 illustrates a more detailed version of cloud computing service 321. Specifically, FIG. 6 illustrates a blow up of data object 381 on cloud service 321. Data object 381 includes object data 600, settings 601, and metadata 602. While not necessarily stored separately from object data 600, settings 601 and metadata 602 are included in behavior information 371 as indicated by the arrow. Data objects 380, 382, and 383 include settings and metadata as well, which may also be included in information 371, but are not shown for clarity. While settings 601 and metadata 602 are shown as being part of data object 381, cloud service 321 may maintain settings 601 and metadata 602 elsewhere. For example, cloud service 321 may maintain a separate data structure for storing such information in association with each data object. As noted above, that separate data structure may also include other data comprising information 371. When reputation analysis system 301 requests information 371 in accordance with operation 400, cloud service 321 transfers at least a portion of settings 601 and metadata 602 as part of information 371 in response to the request.

In some embodiments, depending on whether entity 304 allows reputation analysis system 301 to access object data, at least a portion of object data 600 may also transferred as part of information 371 to reputation analysis system 301 for use when determining the employee's reputation. For example, reputation analysis system 301 may consider object data 600 when determining whether the exposure of data object 381 adversely affects the employee's reputation.

Figure 7:
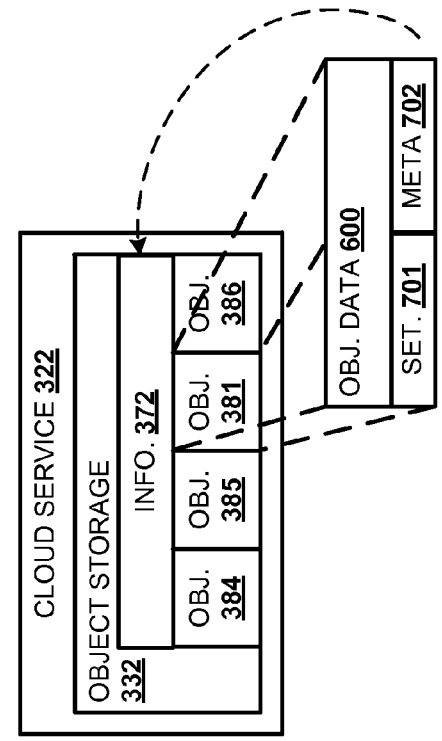
FIG. 7 illustrates a cloud computing service for determining user reputation regarding data object exposure in a cloud computing environment.

FIG. 7 illustrates a more detailed version of cloud computing service 322. Specifically, FIG. 7 illustrates a blow up of data object 381 on cloud service 322 rather than cloud service 321. Data object 381 includes object data 600, settings 701, and metadata 702. While not necessarily stored separately from object data 600, settings 701 and metadata 702 are included in behavior information 372 as indicated by the arrow. Data objects 384, 385, and 386 include settings and metadata as well, which may also be included in information 372, but are not shown for clarity. Since cloud service 322 is separate from cloud service 321, while object data 600 may be the same on cloud service 322, settings 701 and metadata 702 are different for cloud service 322 than settings 601 and metadata 602 for cloud service 321. The settings and metadata may be different due to the differences in cloud computing platforms between services 321 and 322. Likewise, the settings and metadata may be configured to have different exposure levels on each service.

As is the case with cloud service 321, while settings 701 and metadata 702 are shown as being part of data object 381, cloud service 322 may maintain settings 701 and metadata 702 elsewhere. As noted above, that separate data structure may also include other data comprising information 371. When reputation analysis system 301 requests information 372 in accordance with operation 400, cloud service 322 transfers at least a portion of settings 701 and metadata 702 as part of information 372 in response to the request.

In some embodiments, if reputation analysis system 301 is allowed to receive object data 600, reputation analysis system 301 uses object data 600 to classify data object 381 as being related to a particular business unit, topic, sensitivity, or other form of classification. For example, reputation analysis system 301 may review the contents of object data 600 to determine that data object 381 is a legal document that should not be shared outside of entity 304's legal department for any reason in accordance with the rules.

From this classification, if the data object 381 is available for access by individuals outside of the legal department, reputation analysis system 301 may generate a poorer reputation for exposure than if data object 381 was not so accessible.

Furthermore, the classification of data objects into particular groupings (e.g. business unit) allows for employee reputations to be separated into reputations pertaining to each grouping. A notification message indicating a group specific reputation can be directed to an administrator in charge of the data maintained in that grouping rather than an administrator in charge of all data. Similarly, such an administrator may receive notifications that represent reputations in the aggregate for multiple employees that manage data objects of that grouping in cloud services 321 and 322.

In other examples, reputation analysis system 301 is able to classify data object 381 without having access to object data 600. In those examples, a user may aid reputation analysis system 301 by indicating a classification or reputation analysis system 301 may infer a classification based on other information, such as the name of a container (e.g. folder) for data object 381, a position of the employee (e.g. a legal department employee likely manages legal documents), or other information that may suggest a classification for a data object.

In some embodiments, if a separate reputation is determined for the employee in each of cloud services 321 and 322, then a notification may be generated if the indications of exposure differ by more than a threshold. The notification may simply indicate the anomaly or may indicate specific exposure characteristics that caused the difference in reputations. For example, if the reputation is represented as a number on a scale of 1 to 10, with 1 indicated that the employee has the worst possible reputation for exposing objects, reputation analysis system 301 will generate a notification if the employee has a rank of 3 in one service and 8 in the other. This notification may be presented to any individual or system to which notifications may be sent as discussed elsewhere herein.

FIG. 8 illustrates at least a portion of the information 371 and 372 that may be transferred to reputation analysis system 301 in operation 400. Upon receiving information 371 and 372, reputation analysis system 301 identifies exposure characteristics and analyzes the characteristics using rules in operation 500 described above.

Information 371 includes account information 801 for the employee in cloud service 321. Account information 801 indicates that the employee's account has 5 daily logins. The number of daily logins may be an average number of logins over a multi-day period, may be a number of logins for the current day up to the time information 371 is requested, may be a number of logins for the previous full day, or some other possible measure of daily logins. Additionally, account information 801 indicates that the number of user systems that access the account is 3 and the number of data objects maintained for the account is 26.

Information 371 further includes settings 601 and metadata 602. Settings 601 indicate that data object 381 is under user John Doe's account (from which reputation analysis system 301 may be able to determine other employee information), is being shared with 2 other users (some examples may identify those users and indicate whether those other users are employees of entity 304), and is not located in a publicly accessible folder. Metadata 602 indicates that object data 381 is a file, it was last accessed 3 days ago, and is a Human Resources (HR) file. It should be understood that information 371 may also include settings and metadata for other objects, which are not shown for clarity.

Information 372 includes account information 802 for the employee in cloud service 322. Account information 322 indicates that the account has 32 daily logins, that 8 different user systems have accessed the account, and that the account maintains 87 data objects. Additionally, information 372 includes settings 701 and metadata 702. Settings 701 indicate that data object 381 is being shared with no other users but is located in a publicly accessible folder. Metadata 702 indicates that object data 381 is a file, it was last accessed 22 minutes ago, and is located in a folder labeled miscellaneous.

From on information 371 and 372, reputation analysis system 301 identifies exposure characteristics. An exposure characteristic may simply comprise an item of information 371 and 371, such as the number of user systems that have accessed the account. Alternatively, some of the exposure characteristics will be identified by reputation analysis system 301 by deriving the exposure characteristic from the information. For example, an exposure characteristic may be an aggregation of settings for multiple data objects. Thus, reputation analysis system 301 may need to perform calculations on items (e.g. adding, averaging, etc.) of the received information to identify the exposure characteristic. Similarly, reputation analysis system 301 may need to process previously received items of information 371 and 372 to arrive at various exposure characteristics. For example, if the number of daily logins merely reflects the number of daily logins on a most recent day, then reputation analysis system 301 would need to track previously received numbers of daily logins in order to generate an average number of daily logins over a period of time, as may be one exposure characteristic.

Once the exposure characteristics have been identified, reputation analysis system 301 determines one or more reputations of the employee for exposing data objects in each of cloud environments 321 and 322. Alternatively, or in addition to the two individual reputations, an aggregate reputation for the employee across both services may also be determined.

Depending on thresholds and characteristics defined in rules applied by reputation analysis system 301, the exposure characteristics identified from information 371 and 372 may adversely impact the reputations determined by reputation analysis system 301. In particular, the rules may indicate that both the number of daily logins and the number of user systems in account information 802 are above a desired threshold. Moreover, the rules may indicate that object 381 is over exposed for being in a public folder according to settings 701. Therefore, reputation analysis system 301 generates a reputation for the employee's exposure behavior in cloud service 322 as being relatively poor (e.g. 3 on a scale of 1-10 with 10 being the best reputation an employee may receive for not exposing objects). In contrast, the exposure characteristics in information 371 satisfy the rules to the point that reputation analysis system 301 generates a good reputation for behavior in cloud service 321 (e.g. 8 on the scale of 1-10). Similarly, a third aggregate reputation may be generated for the employee to represent the employee's reputation across both cloud services. This aggregate reputation may be somewhere in between the two example reputations above (e.g. 6 on the scale of 1-10).

After generating the reputations, reputation analysis system 301 then notifies entity 304 of the reputations for the employee. Entity 304 is then aware of the employee's reputation and can take actions to improve the employee's reputation to prevent unnecessary data object exposure.

Figure 9:
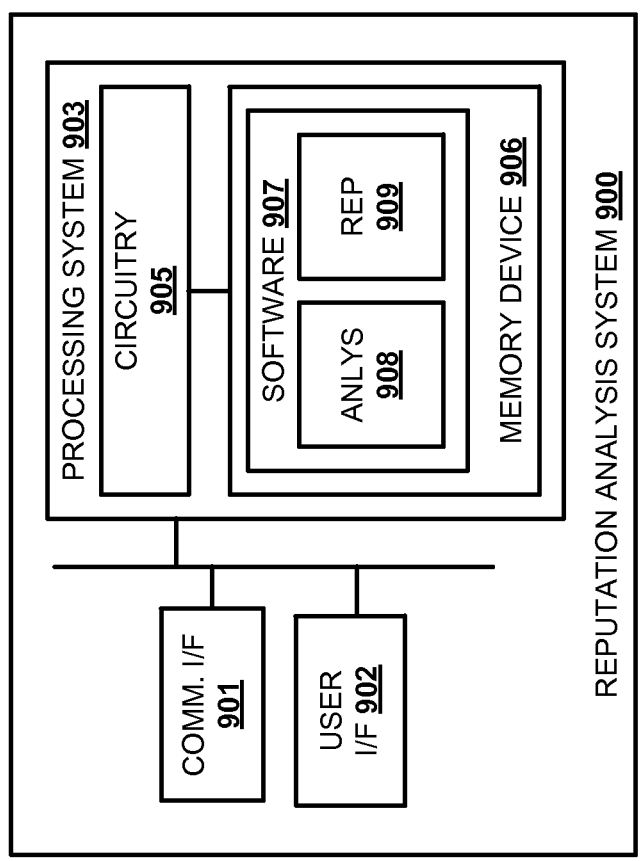
FIG. 9 illustrates a reputation analysis system for determining user reputation regarding data object exposure in a cloud computing environment.

FIG. 9 illustrates reputation analysis system 900. Reputation analysis system 900 is an example of reputation analysis systems 101 and 301, although systems 101 and 301 may use alternative configurations. Reputation analysis system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes exposure characteristics analysis module 908 and user reputation module 909. Operating software 907 may further include an operating system, utilities, drivers, network interfaces, applications, or some other type of software. When executed by circuitry 905, operating software 907 directs processing system 903 to operate reputation analysis system 900 as described herein.

In particular, exposure characteristics analysis module 908 directs processing system 903 to receive, from a cloud computing environment, information regarding behavior of a user in the cloud computing environment. Module 908 further directs processing system 903 to analyze the information to determine a plurality of exposure characteristics for the user. User reputation module 909 directs processing system 903 to determine a reputation of the user for exposing data objects in the cloud computing environment based on the plurality of exposure characteristics.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining user reputation regarding data object exposure in a cloud computing environment, comprising:

in a reputation analysis system, using at least one Application Programming Interface (API) call to execute code in the cloud computing environment that instructs the cloud computing environment on behalf of the reputation analysis system to transfer information regarding behavior of a user in the cloud computing environment to the reputation analysis system either periodically or upon at least one trigger;

in the reputation analysis system, receiving the information from the cloud computing environment;

analyzing the information to determine a plurality of exposure characteristics for the user, wherein each exposure characteristic of the plurality of exposure characteristics comprises one or more items of the information that indicate exposure of a plurality of data objects associated with the user and include one or more of a number of container objects created by the user, a number of objects created by the user in the cloud computing environment, and a ratio of the number of container objects created by the user to a number of non-container objects created by the user, and wherein the exposure of the plurality of data objects comprises accessibility of the plurality of data objects beyond what is desired by an interested party to the plurality of data objects; and determining a reputation of the user for exposing the plurality of data objects in the cloud computing environment based on the plurality of exposure characteristics.

2. The method of claim 1, wherein determining a reputation of the user for exposing data objects in the cloud computing environment, comprises:

applying a plurality of rules to the plurality of exposure characteristics; and determining the reputation based on how well the plurality of exposure characteristics comply with the plurality of rules.

3. The method of claim 1, wherein the information includes accessibility settings for the plurality of data objects associated with the user in the cloud computing environment.

4. The method of claim 1, wherein the information includes classifications for each of the plurality of data objects associated with the user.

5. The method of claim 1, wherein the code further instructs the cloud computing environment to transfer updates to the information in response to changes associated with the user in the cloud computing environment, and the method further comprising:

receiving the updates from the cloud computing environment;

analyzing the updates to determine an updated plurality of exposure characteristics; and adjusting the reputation based on the updated plurality of exposure characteristics.

6. The method of claim 1, further comprising:

transferring a notification indicating the reputation when the reputation is worse than to a reputation threshold.

7. The method of claim 1, further comprising:

generating a notification indicating the reputation and remedial actions that will compensate for the reputation.

8. The method of claim 1, wherein the cloud computing environment includes at least two cloud computing services associated with the user and wherein receiving the information comprises:

receiving first information regarding behavior of the user from a first cloud computing service of the cloud computing services; and receiving second information regarding behavior of the user from a second cloud computing service of the cloud computing services.

9. The method of claim 1, wherein determining the reputation comprises:

lowering a current reputation if the plurality of exposure characteristics indicates a higher risk of exposure than a risk of exposure indicated by the current reputation.

10. A non-transitory computer readable storage medium having instructions stored thereon for operating a reputation analysis system to determine user reputation regarding data object exposure in a cloud computing environment, the instructions, when executed by the reputation analysis system, direct the reputation analysis system to:

use at least one Application Programming Interface (API) call to execute code in the cloud computing environment that instructs the cloud computing environment on behalf of the reputation analysis system to transfer information regarding behavior of a user in the cloud computing environment either periodically or upon at least one trigger;

receive the information from the cloud computing environment;

analyze the information to determine a plurality of exposure characteristics for the user, wherein each exposure characteristic of the plurality of exposure characteristics comprises one or more items of the information that indicate exposure of a plurality of data objects associated with the user and include one or more of a number of container objects created by the user, a number of objects created by the user in the cloud computing environment, and a ratio of the number of container objects created by the user to a number of non-container objects created by the user, and wherein the exposure of the plurality of data objects comprises accessibility of the plurality of data objects beyond what is desired by an interested party to the plurality of data objects; and determine a reputation of the user for exposing the plurality of data objects in the cloud computing environment based on the plurality of exposure characteristics.

11. The non-transitory computer readable storage medium of claim 10, wherein the instructions that direct the reputation analysis system to determine the reputation of the user comprise instructions that direct the reputation analysis system to:

apply a plurality of rules to the plurality of exposure characteristics; and determine the reputation based on how well the plurality of exposure characteristics comply with the plurality of rules.

12. The non-transitory computer readable storage medium of claim 10, wherein the information includes accessibility settings for the plurality of data objects associated with the user in the cloud computing environment.

13. The non-transitory computer readable storage medium of claim 10, wherein the information includes classifications for each of the plurality of data objects associated with the user.

14. The non-transitory computer readable storage medium of claim 10, wherein the code further instructs the cloud computing environment to transfer updates to the information in response to changes associated with the user in the cloud computing environment, and the instructions further direct the reputation analysis system to:

receive the updates from the cloud computing environment;

analyze the updates to determine an updated plurality of exposure characteristics; and adjust the reputation based on the updated plurality of exposure characteristics.

15. The non-transitory computer readable storage medium of claim 14, wherein the instructions further direct the reputation analysis system to:

transfer a notification indicating the reputation when the reputation is worse than to a reputation threshold.

16. The non-transitory computer readable storage medium of claim 10, wherein the instructions further direct the reputation analysis system to:

generate a notification indicating the reputation and remedial actions that will compensate for the reputation.

17. The non-transitory computer readable storage medium of claim 10, wherein the cloud computing environment includes at least two cloud computing services associated with the user and wherein the instructions that direct the reputation analysis system to receive the information comprise instruction that direct the reputation analysis system to:

receive first information regarding behavior of the user from a first cloud computing service of the cloud computing services; and receive second information regarding behavior of the user from a second cloud computing service of the cloud computing services.

18. The non-transitory computer readable storage medium of claim 10, wherein the instructions that direct the reputation analysis system to determine the reputation comprise instructions that direct the reputation analysis system to:

lower a current reputation if the plurality of exposure characteristics indicates a higher risk of exposure than a risk of exposure indicated by the current reputation.

19. A reputation analysis system for determining user reputation regarding data object exposure in a cloud computing environment, comprising:

a network communication interface configured to receive, from the cloud computing environment, information regarding behavior of a user in the cloud computing environment; and a processing system configured to use at least one Application Programming Interface (API) call to execute code in the cloud computing environment that instructs the cloud computing environment on behalf of the reputation analysis system to transfer the information to the reputation analysis system either periodically or upon at least one trigger, analyze the information to determine a plurality of exposure characteristics for the user, wherein each exposure characteristic of the plurality of exposure characteristics comprises one or more items of the information that indicate exposure of a plurality of data objects associated with the user and include one or more of a number of container objects created by the user, a number of objects created by the user in the cloud computing environment, and a ratio of the number of container objects created by the user to a number of non-container objects created by the user, and wherein the exposure of the plurality of data objects comprises accessibility of the plurality of data objects beyond what is desired by an interested party to the plurality of data objects, and determining a reputation of the user for exposing the plurality of data objects in the cloud computing environment based on the plurality of exposure characteristics.

20. The reputation analysis system of claim 19, wherein the processing system configured to determine a reputation of the user for exposing data objects in the cloud computing environment, comprises:

the processing system configured to apply a plurality of rules to the plurality of exposure characteristics and determine the reputation based on how well the plurality of exposure characteristics comply with the plurality of rules.

* * * * *